US012034250B2

(12) United States Patent
Kuo et al.

(10) Patent No.: US 12,034,250 B2

(45) Date of Patent: Jul. 9, 2024

(54) CONNECTOR ASSEMBLY WITH HOUSING PANEL POSITIONING AND PLUG CONNECTOR THEREOF

(71) Applicant: ACES ELECTRONICS CO., LTD., Taoyuan (TW)

(72) Inventors: Rong-Hsun Kuo, Taoyuan (TW); Chien-Hsiang Teng, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 308 days.

(21) Appl. No.: 17/567,277

(22) Filed: Jan. 3, 2022

(65) Prior Publication Data

US 2023/0216243 A1 Jul. 6, 2023

(51) Int. Cl.

| | |
|---|---|
| ***H01R 13/631*** | (2006.01) |
| ***H01R 13/52*** | (2006.01) |
| ***H01R 13/625*** | (2006.01) |
| *H01R 24/64* | (2011.01) |

(52) U.S. Cl.

CPC ....... *H01R 13/631* (2013.01); *H01R 13/5202* (2013.01); *H01R 13/625* (2013.01); *H01R 24/64* (2013.01)

(58) Field of Classification Search

CPC .. H01R 13/631; H01R 13/5202; H01R 24/64; H01R 13/516; H01R 13/625; H01R 13/5219

See application file for complete search history.

(56) References Cited

U.S. PATENT DOCUMENTS

| | | | | |
|---|---|---|---|---|
| 6,595,791 | B2 * | 7/2003 | Below | H01R 24/64 439/271 |
| 7,367,848 | B2 * | 5/2008 | John | H01R 13/5202 439/676 |
| 8,337,240 | B2 * | 12/2012 | Feldmeier | H01R 13/04 439/681 |
| 9,160,099 | B2 * | 10/2015 | Pfiffi | H01R 24/64 |
| 9,437,961 | B1 * | 9/2016 | Smajda | H01R 13/28 |
| 10,790,613 | B2 * | 9/2020 | Ramos | H01R 13/5205 |
| 2013/0102201 | A1 * | 4/2013 | Montena | H01R 13/622 439/660 |

* cited by examiner

*Primary Examiner* — Briggitte R. Hammond

(74) *Attorney, Agent, or Firm* — MUNCY, GEISSLER, OLDS & LOWE, P.C.

(57) ABSTRACT

A connector assembly with housing panel positioning and plug connector thereof is disclosed. The connector assembly includes a fixing block and a socket connector positioned on two opposite sides of a housing panel, and a plug connector installed in the fixing block and electrically connected to the socket connector. Through the action of rotation and pushing, the plug connector is combined with the positioning column of the fixing block on the housing panel, and the plug head of the plug connector is electrically connected to the socket connector.

20 Claims, 9 Drawing Sheets

CONNECTOR ASSEMBLY WITH HOUSING PANEL POSITIONING AND PLUG CONNECTOR THEREOF

BACKGROUND OF THE INVENTION

1. Field of the Invention

The present invention relates to electrical connector technology, and more particularly to a connector assembly with housing panel positioning and plug connector thereof, which is so configured that through the action of rotation and pushing, the plug connector is combined with the positioning column of the fixing block on the housing panel, and the plug head of the plug connector is electrically connected to the socket connector.

2. Description of the Related Art

Nowadays, the transmission speed of network technology continues to increase, and network cloud technology has been developed to transmit more electronic information through network cloud technology. As the demand for communication bandwidth and speed continues to increase, electronic equipment used for network signal transmission (such as computer servers, telecom boxes in outdoor environments, etc.) must also move towards the direction of strong computing function, fast speed and small size, which has become the main development trend of electronic equipment. When electronic equipment is processing huge data calculations, there is an urgent need for high-density and large numbers of connectors (such as optical fiber, RJ45, etc.) to transmit data. As we all know, in most electronic devices, whether installed indoors or in the external environment, socket connectors are provided in the fixing block of the electronic equipment chassis, and the plug of the installed cable is passed through the chassis fixing block and the corresponding socket connector to form an electrical connection. However, some electronic devices are limited by the specifications of a uniform size and space, and the number of connectors required for the fixing block of the electronic device chassis is large, which in turn causes the density between adjacent connectors to increase, and the gap becomes smaller, resulting in a problem that is difficult to disassemble and assemble. Therefore, the relevant industry must not only think about how to place more connectors in the limited space, but also consider how the plugs of the installed cables can be easily disassembled and assembled with the socket connectors in the fixing block of the electronic equipment chassis, and it is also necessary to further ensure the stability of the electrical connection of the connector. Therefore, how to solve the deficiencies and deficiencies of conventional use is the direction that people in this industry urgently want to improve.

SUMMARY OF THE INVENTION

Therefore, in view of the above-mentioned deficiencies in the conventional use, the inventor specializes in his years of research and development experience in this industry, and through continuous trials and modifications, he began to design this type of connector assembly with housing panel positioning and plug head thereof.

The connector assembly of the present invention comprises a fixing block positioned on one side of a housing panel, a socket connector positioned on the other side of the housing panel, and a plug connector installed in the fixing block and electrically connected to the socket connector. The fixing block comprises a block plate positioned in the housing panel, a positioning column protruded from the block plate opposite to the housing panel, and a perforation axially penetrated through the positioning column and the block plate and corresponding to a respective perforation on the housing panel. The positioning column comprises a guiding groove located on the periphery thereof and extending and recessed from a suspended end thereof remote toward the block plate and in a turning shape, and a sliding groove located on the periphery on one side of the turning direction of the guiding groove and extending and recessed from the suspended end toward the block plate. The plug connector comprises a plug connection block that comprises a plug portion, a plug head located on a front side of the plug portion and a connecting portion located on an opposing rear side of the plug portion, a bushing sleeved onto the plug connection block, and a cable axially inserted into the connecting portion and the plug portion and electrically connected to the plug head. The plug connector is rotatably positioned in the positioning column of the fixing block so that the plug head is connected to the socket connector. The bushing comprises a fitting hole that receives the plug connection block, at least two lugs and a moving space provided on an inner wall surface of the fitting hole, and a moving block coupled to the moving space and movable in the direction of the plug head. The moving block comprises a hook portion. The hook portion can be protruded from the outside in the fitting hole. The bushing can be rotated to move the lugs into the guiding groove for positioning and force the hook portion of the moving block into the sliding groove for positioning after connection between the plug connection block and the socket connector. Through the action of rotation and pushing, the plug connector is combined with the positioning column of the fixing block on the housing panel, and the plug head of the plug connector is electrically connected to the socket connector. Thereby, the utility of easy disassembly and assembly, firm combination and small operation space is achieved.

According to another aspect of the present invention, a gasket, a waterproof ring and a sealing member are provided to seal the gap between the housing panel and the fixing block, the gap between the fixing block and the plug connection block and the gap between the plug connection block and the cable, so that the electrical structure formed by the socket connector, the plug head of the plug connection block and the cable has the effect of waterproofing.

According to another aspect of the present invention, a spring is set between the moving block and the bushing. After the lugs of the bushing of the plug head are inserted into the guiding groove of the positioning column and positioned after rotation, the hook portion of the moving block is automatically pushed into place by the spring force of the spring, which can effectively prevent the plug connector from rotating displacement or unlocking.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
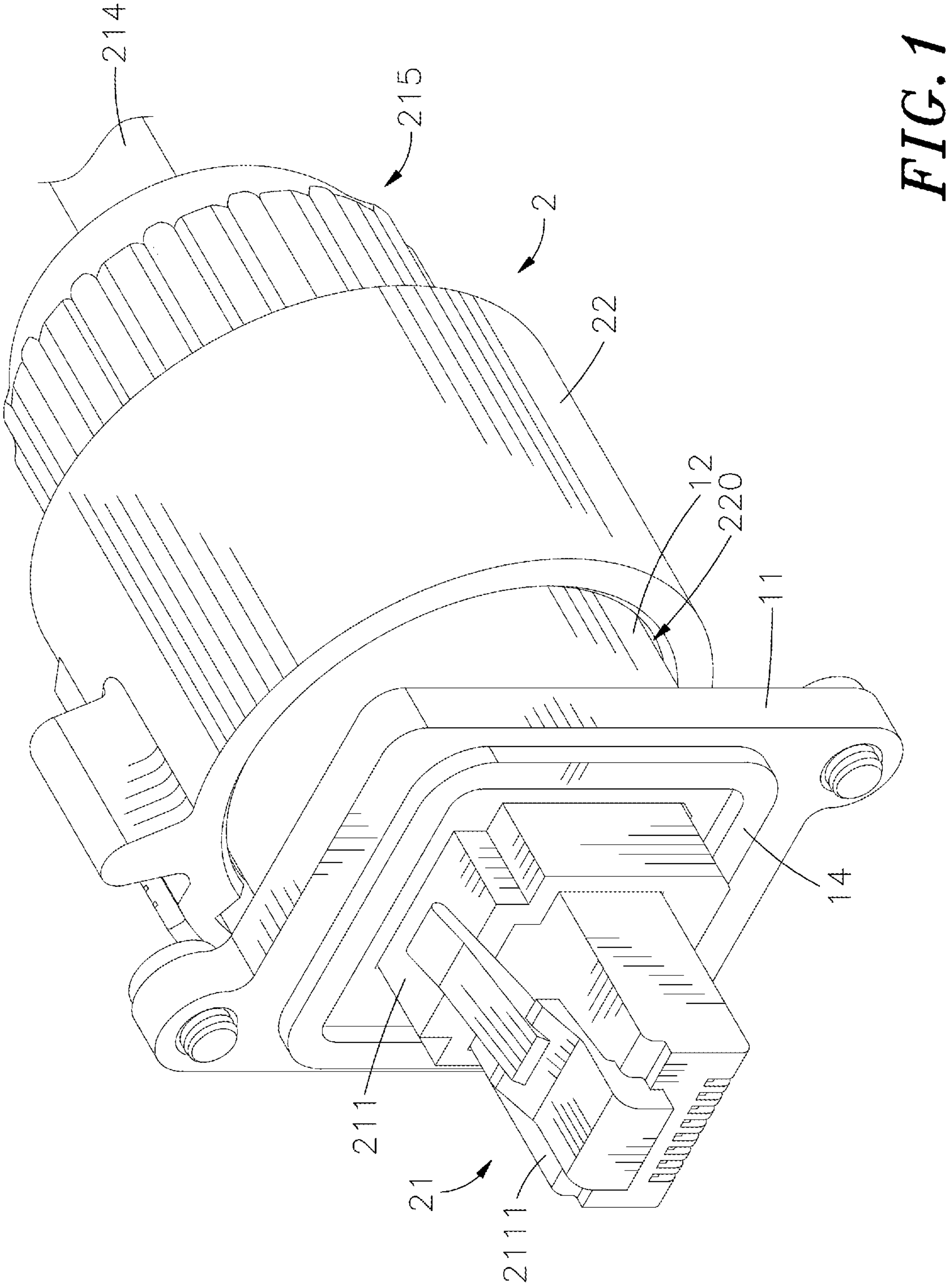
FIG. 1 is an oblique top elevational view of the fixing block and plug connector of the present invention after being combined.
Figure 2:
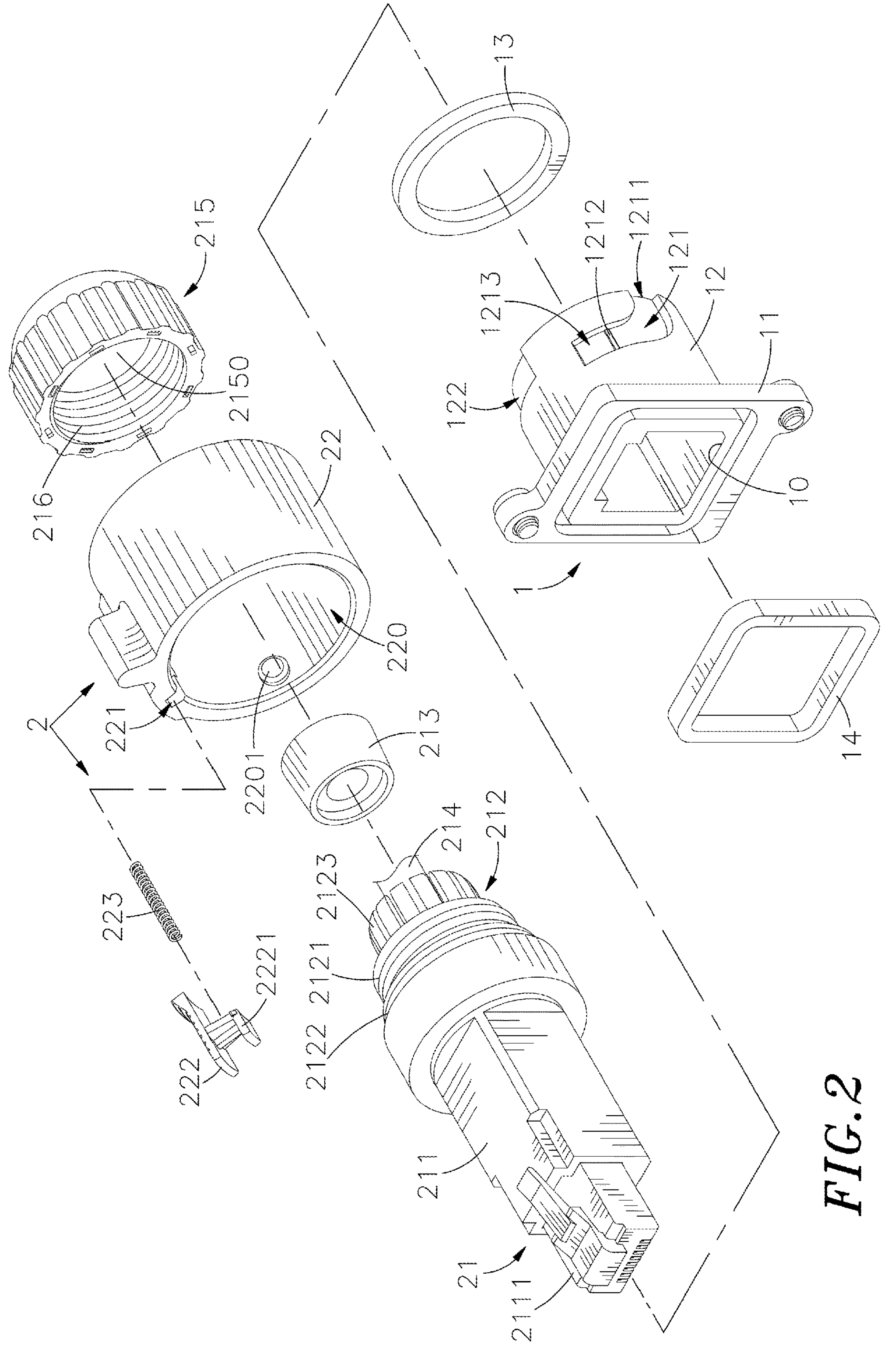
FIG. 2 is an exploded view of the fixing block and plug connector of the present invention.
Figure 3:
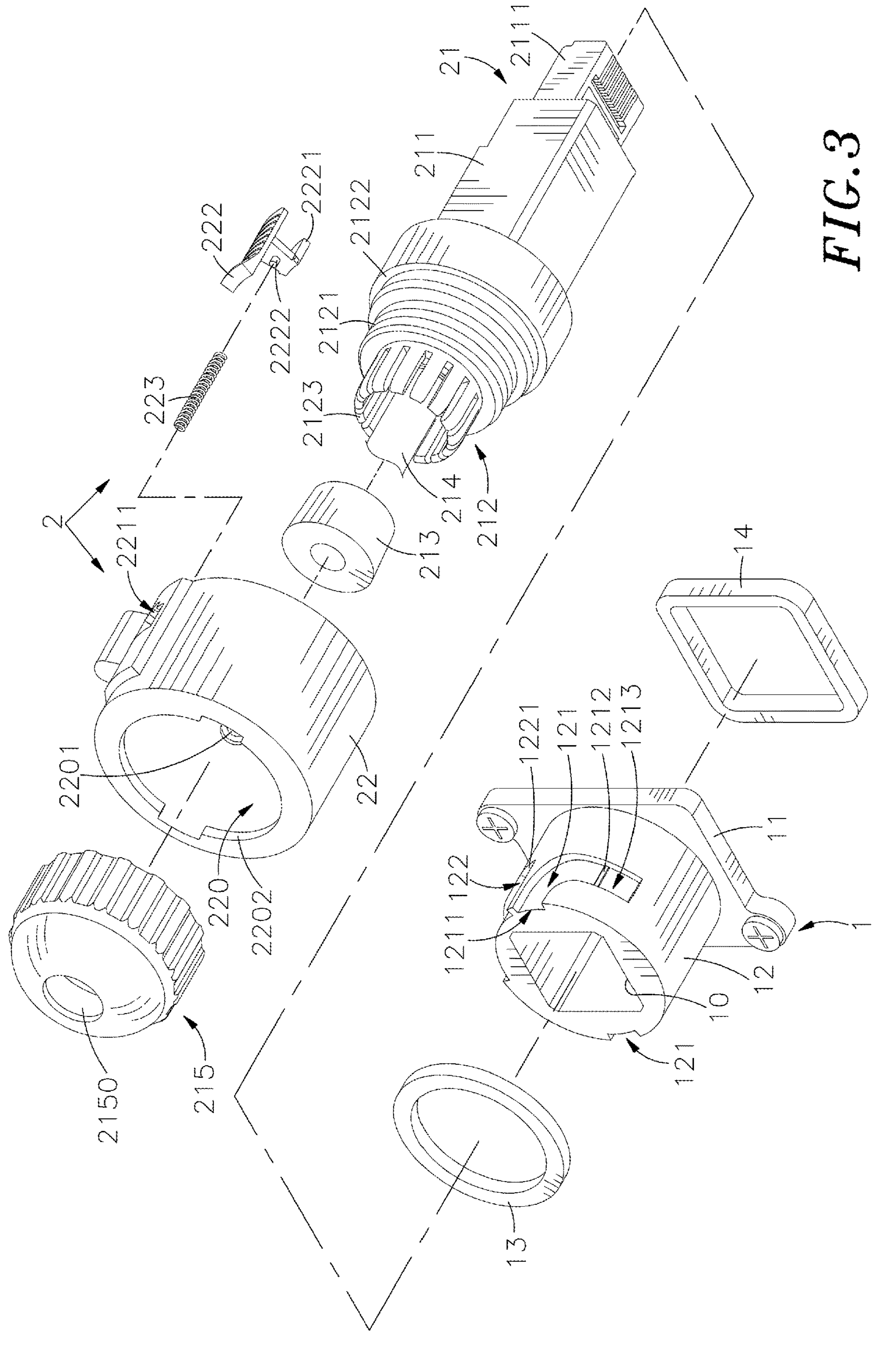
FIG. 3 is an exploded view of the fixing block and plug connector of the present invention when viewed from another angle.
Figure 4:
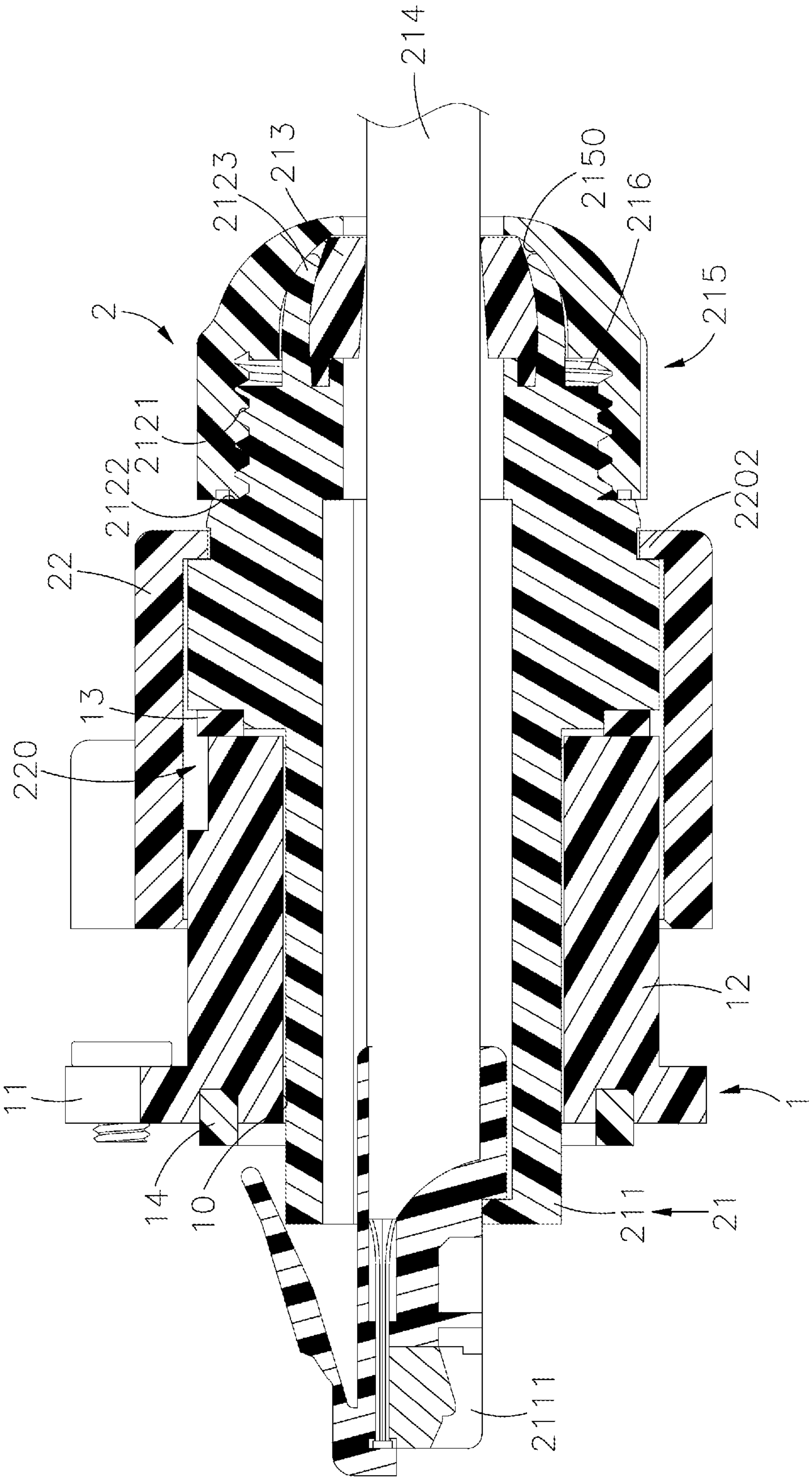
FIG. 4 is a schematic cross-sectional view of the plug connector of the present invention after being combined.
Figure 5:
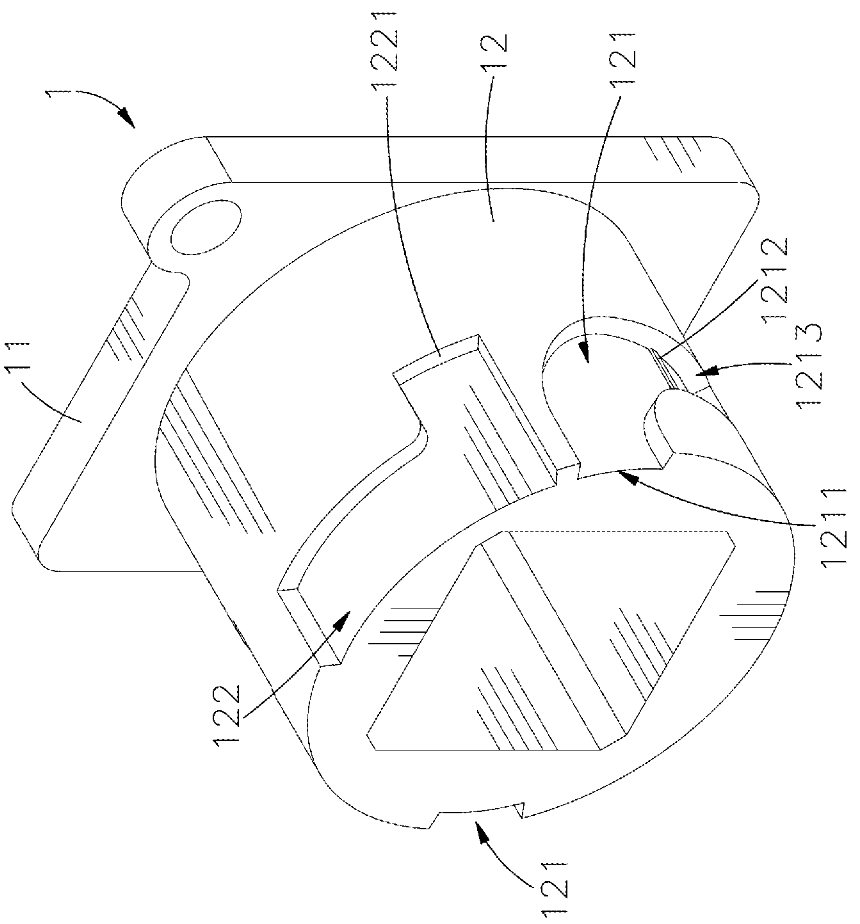
FIG. 5 is an oblique top elevational view of the fixing block of the present invention.
Figure 6:
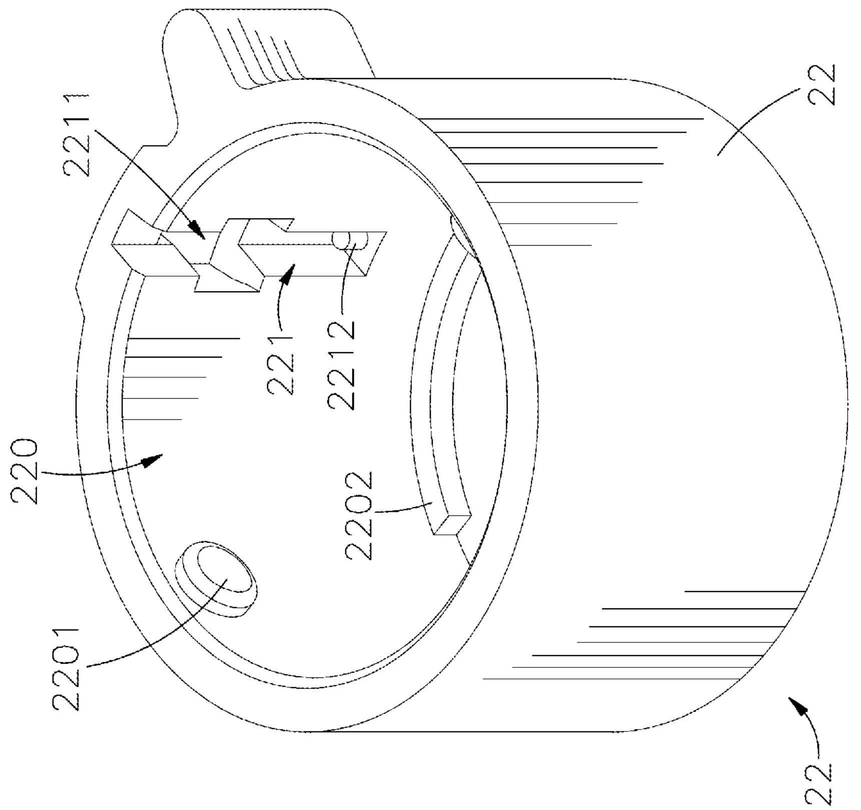
FIG. 6 is an elevational view of the bushing of the present invention.
Figure 8:
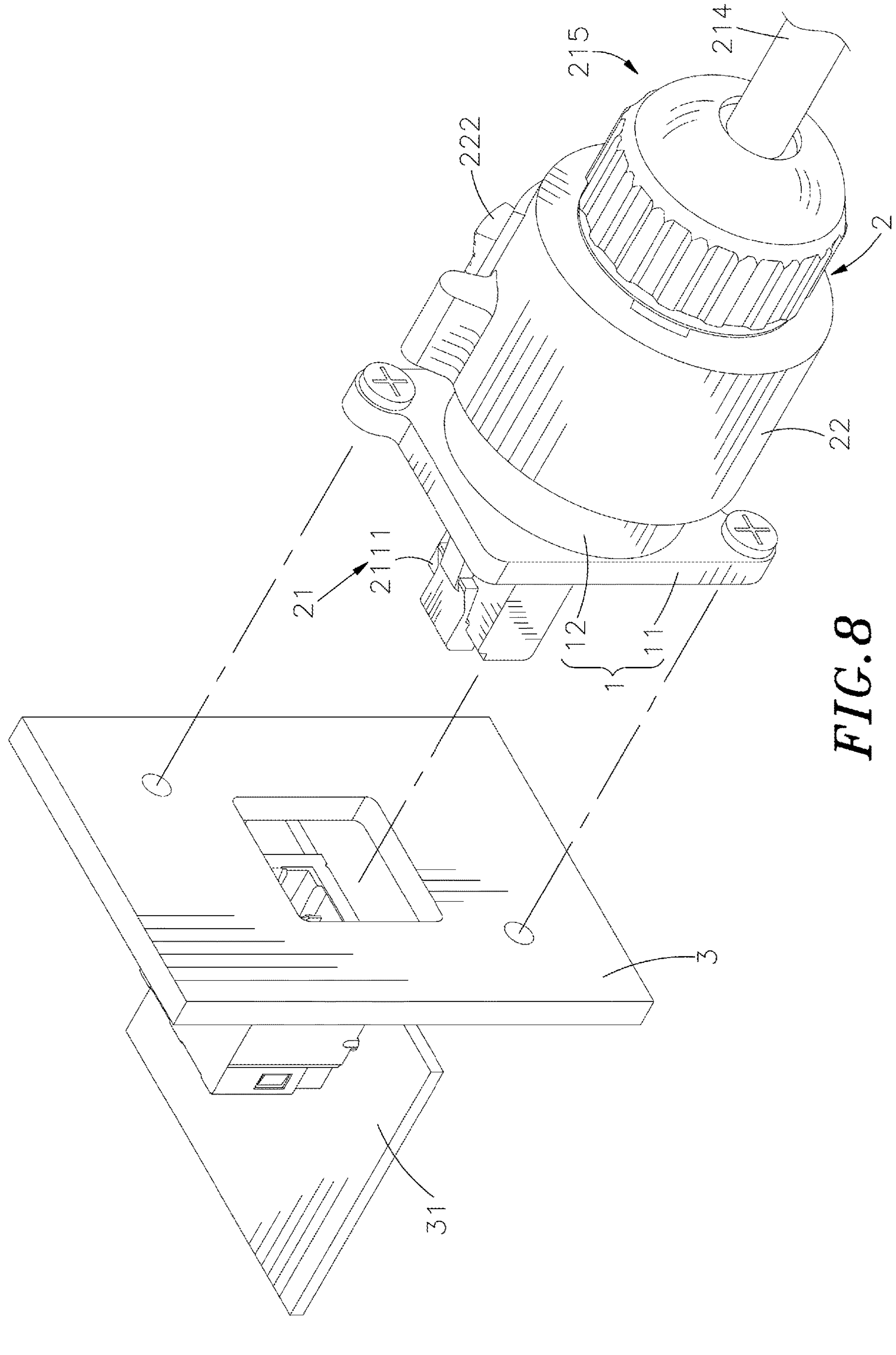
FIG. 8 is an exploded view of the fixing block, plug connector and housing panel of the present invention.

Referring to FIGS. 1, 2, 3, 4, 5, 6 and 8, as can be clearly seen from the drawings, the connector assembly with housing panel positioning of the present invention comprises a fixing block 1 and a socket connector 31 and a plug connector 2 respectively positioned on two sides of a housing panel 3.

The fixing block 1 comprises a block plate 11 positioned in the housing panel 3, a gasket 14 provided between the surface of the fixing block 1 and the housing panel 3, a positioning column 12 protruded from one side of the block plate 11 opposite to the housing panel 3, and a perforation 10 axially penetrated through the positioning column 12 and the block plate 11 and corresponding to a respective perforation on the housing panel 3. The positioning column 12 has a guiding groove 121 located on the periphery thereof and extending and recessed from a suspended end remote from the block plate 11 toward the block plate 11 and in a turning shape, and a sliding groove 122 located on the periphery on one side of the turning direction of the guiding groove 121 and extending and recessed from the suspended end toward the block plate 11, and a narrow positioning groove 1221 at an inner side of the sliding groove 122. The guiding groove 121 is provided with an introduction port 1211 at the suspended end, and a convex rib 1212 and a positioning space 1213 at a distance after turning. Furthermore, a waterproof ring 13 is also clamped and positioned between the positioning column 12 and a plug connection block 21 of the plug connector 2.

The plug connector 2 comprises the aforesaid plug connection block 21 that comprises a plug portion 211, a plug head 2111 located on a front side of the plug portion 211, a connecting portion 212 located on an opposing rear side of the plug portion 211, a stop step 2122 extending around the periphery of the connecting portion 212 and adjacent to the plug portion 211, a plurality of elastic claws 2123 equiangularly arranged at a free end of the connecting portion 212 remote from the stop step 2122, an outer thread 2121 spirally extending around the periphery of the connecting portion 212 between the stop step 2122 and the elastic claws 2123, a bushing 22 sleeved onto the plug connection block 21, a cable 214 axially inserted into the connecting portion 212 and the plug portion 211 and electrically connected to the plug head 2111, a sealing member 213 mounted around the cable 214 and clamped by the elastic claws 2123, and a back cover 215 that has an inner thread 216 threaded with the outer thread 2121 to force the elastic claws 2123 against the periphery of the sealing member 213 to form a water sealing structure and a perforation 2150 for the passing of the cable 214. The plug connector 2 is rotatably positioned in the fixing block positioning column 12 so that the plug head 2111 can be connected to the socket connector 31. The bushing 22 comprises a fitting hole 220 that receives the plug connection block 21, at least two lugs 2201 and a moving space 221 provided on the inner wall surface of the fitting hole 220, a perforation 2211 cut through the peripheral wall thereof and connected to the moving space 221, a moving block 222 having a hook portion 2221 thereof inserted through the perforation 2211 into the moving space 221, and a spring 223 connected between a pin 2222 at the moving block 222 and a pin 2212 at the moving space 221, and a stop convex 2202 extended around the inner wall surface of the fitting hole 220 and stopped against the stop step 2122.

Figure 7:
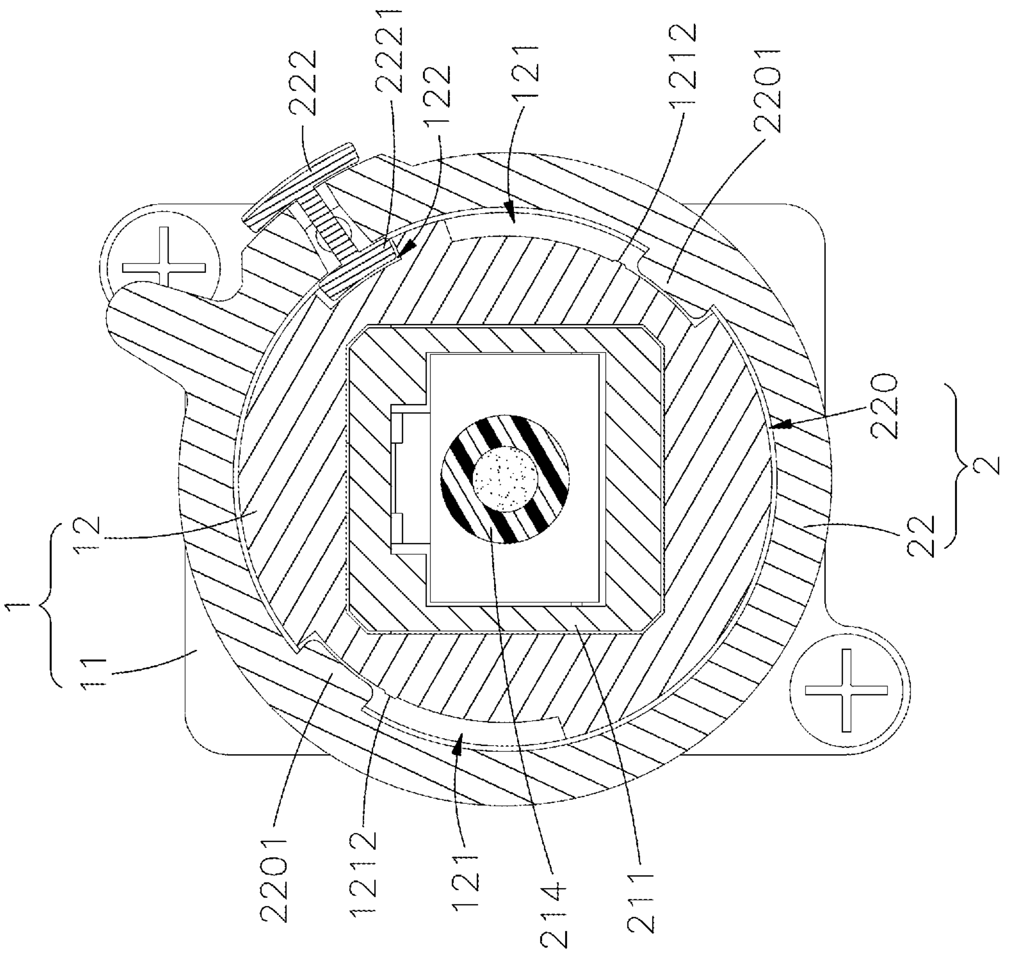
FIG. 7 is a schematic cross-sectional view of the fixing block and plug connector of the present invention after being combined.

Referring to FIGS. 3, 5, 6 and 7, the spring 223 of the present invention is located between the pin 2222 of the moving block 222 and the pin 2212 of the moving space 221 to form an elastic positioning. After the lugs 2201 of the bushing 22 of the plug connector 2 are pushed in the guiding groove 121 of the positioning column 12 through the introduction port 1211, the hook portion 2221 of the moving block 222 is squeezed by the spring 223 and elastically pushed against the sliding groove 122. When the guiding groove 121 rotates over the convex rib 1212 and enters the positioning space 1213 and is positioned therein, the spring 223 uses the pin 2212 of the moving space 221 as a fixed position, and the hook portion 2221 of the moving block 222 is automatically pushed into place by the elastic force of the spring 223 to form a positioning, which can effectively prevent the plug connector 2 from rotating displacement or unlocking.

However, it is understood from the above preferred embodiment that in the illustration of the present invention, the spring 223 is used to form the structure of the automatic push-in engagement positioning. The spring 223 is elastically positioned between the pin 2212 of the moving space 221 and the pin 2222 of the moving block 222. However, the pin 2222 of the moving block 222 and the pin 2212 of the moving space 221 can also be set in a round hole pattern so that the spring 223 can be inserted and used for positioning. In addition, the moving block 222 can also be manually pushed into position without using the spring 223. Such simple structure configuration and changes do not limit the scope of protection of this invention.

Figure 9:
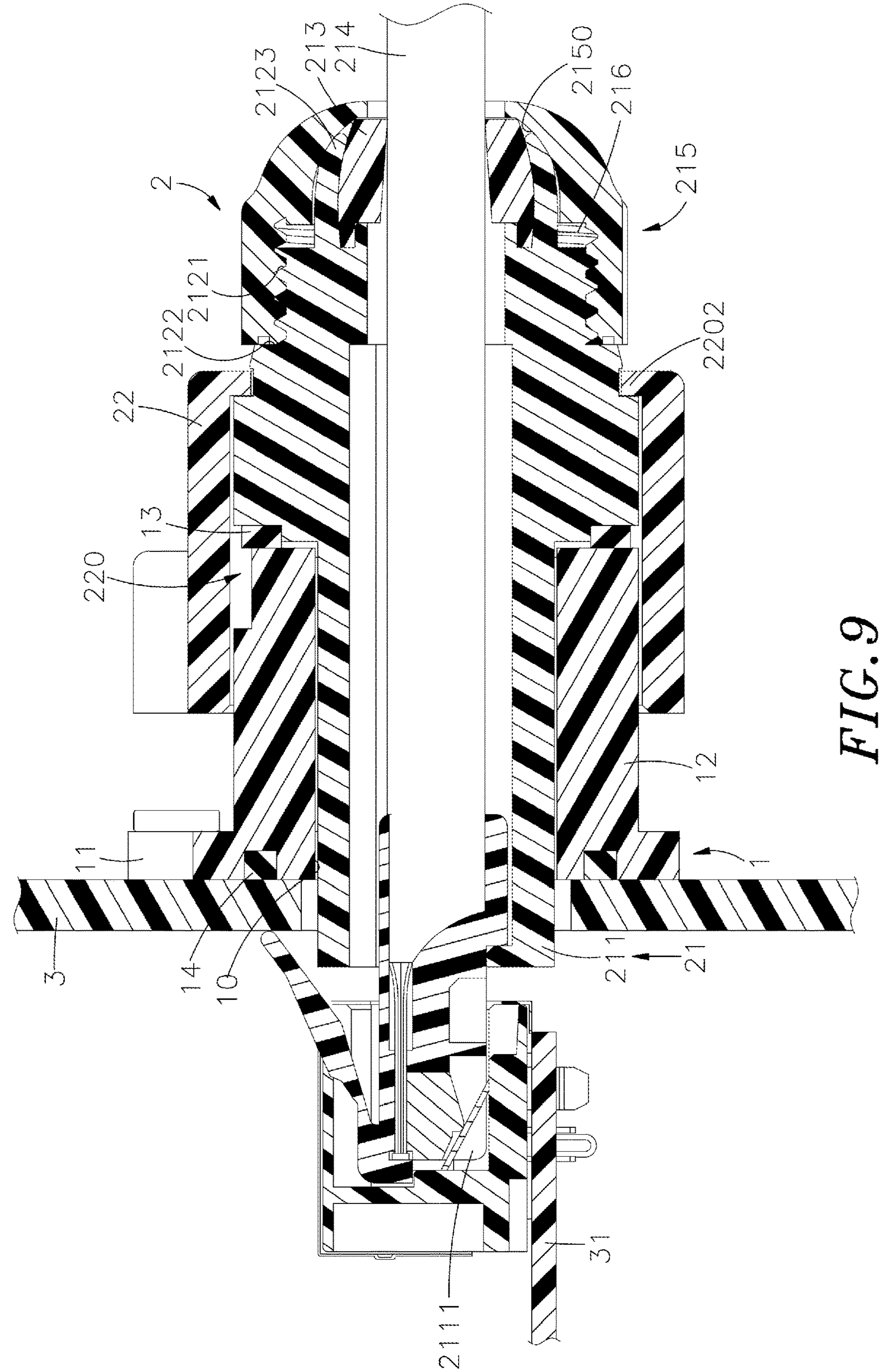
FIG. 9 is a schematic cross-sectional view of the fixing block, plug connector and housing panel of the present invention after being combined.

Referring to FIGS. 2, 3, 4 and 9, in the present invention, the gasket 14 is provided on the surface of the fixing block 1 so that the housing panel 3 and the gasket 14 on the surface of the adjacent fixing block 1 are in contact with each other to form a waterproof structure. The waterproof ring 13 is sandwiched and positioned between the fixing block 1 and the plug connection block 21, so that the plug head 2111 is blocked inside to prevent water ingress. In addition, the sealing member 213 is held in the hollow interior of the elastic claws 2123 of the connecting portion 212 of the plug portion 211, and the cable 214 is passed through the sealing member 213 to form a sealed and waterproof structure at the plug connection block 21. The back cover 215 is set on the outer thread 2121 of the connecting portion 212 to form a fixation.

It can be understood from the above that the waterproof structure of the present invention uses the gasket 14, the waterproof ring 13 and the sealing member 213 to seal the gap between the housing panel 3 and the fixing block 1, the gap between the fixing block 1 and the plug connection block 21 and the gap between the plug connection block 21 and the cable 214, so that the electrical structure formed by the socket connector 31, the plug head 2111 of the plug connection block 21 and the cable 214 has the effect of waterproofing.

However, how the structure of the housing panel 3 and the socket connector 31 of the present invention is configured is not the technical content explored by the present invention. There have been many practices in the general industry today. Such simple structure configuration and changes do not limit the protection of this patent.

In addition, the number of the fixing block 1 and the socket connector 31 located on the two sides of the housing panel 3 of the present invention can be arranged in at least one array or stacked to provide different numbers of the plug connector 2 for plug-in use. Such simple structural configuration and changes do not therefore limit the scope of protection of this patent application.

Two sets or more than two sets of the lugs 2201 in the bushing 22 of the plug connector 2 and the corresponding sets of the guiding grooves 121 can be provided to achieve the same effects. The above simple modifications and equivalent structural changes should be included in the scope of the patent of the present invention in the same way.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A connector assembly with housing panel positioning, comprising a fixing block and a socket connector and a plug connector respectively positioned on two sides of a housing panel, wherein:

said fixing block comprises a block plate positioned in one side of said housing panel, a positioning column protruded from one side of said block plate opposite to said housing panel, and a perforation axially penetrated through said positioning column and said block plate and corresponding to a respective perforation on said housing panel, said positioning column comprising a guiding groove located on a periphery thereof and extending and recessed from a suspended end thereof remote from said block plate toward said block plate and in a turning shape and a sliding groove located on a periphery on one side of a turning direction of said guiding groove and extending and recessed from said suspended end toward said block plate;

said plug connector comprises a plug connection block comprising a plug portion, a plug head located on a front side of said plug portion and a connecting portion located on an opposing rear side of said plug portion, a bushing sleeved onto said plug connection block and a cable axially inserted into said connecting portion and said plug portion and electrically connected to said plug head, said plug connector being rotatably positioned in said positioning column of said fixing block so that said plug head is connected to said socket connector, said bushing comprising a fitting hole that receives said plug connection block, at least two lugs and a moving space provided on an inner wall surface of said fitting hole and a moving block coupled to said moving space and movable in the direction of said plug head, said moving block comprising a hook portion, said hook portion being capable of protruding from the outside thereof in said fitting hole, said bushing being rotatable to move said lugs into said guiding groove for positioning and force said hook portion of said moving block into said sliding groove for positioning after connection between said plug connection block and said socket connector.

2. The connector assembly with housing panel positioning as claimed in claim 1, wherein said bushing is provided with a spring, said spring having two opposite ends thereof respectively stopped against said moving block and a wall surface of said moving space for elastic positioning.

3. The connector assembly with housing panel positioning as claimed in claim 2, wherein a hook portion of said moving block is provided with a pin; said wall surface of said moving space is provided with a pin; said spring has the two opposite ends thereof respectively positioned on the pin on said hook portion of said moving block and the pin on said wall surface of said moving space.

4. The connector assembly with housing panel positioning as claimed in claim 2, wherein said hook portion of said moving block is provided with a round hole; said wall surface of said moving space is provided with a round hole; said spring has the two opposite ends thereof respectively positioned in the round hole on said hook portion of said moving block and the round hole on said wall surface of said moving space.

5. The connector assembly with housing panel positioning as claimed in claim 1, further comprising a gasket set between a surface of said fixing block and said housing panel.

6. The connector assembly with housing panel positioning as claimed in claim 1, wherein said guiding groove is provided with an introduction port at said suspended end, and a convex rib and a positioning space at a distance after turning.

7. The connector assembly with housing panel positioning as claimed in claim 1, wherein said sliding groove has an inner side thereof remote from said suspended end terminating in a narrow positioning groove.

8. The connector assembly with housing panel positioning as claimed in claim 1, further comprising a waterproof ring clamped and positioned between said fixing block and said plug connection block of said plug connector.

9. The connector assembly with housing panel positioning as claimed in claim 1, wherein said hook portion of said moving block is provided with a pin; said wall surface of said moving space is provided with a pin; said bushing of said plug connector is provided with a spring, said spring having two opposite ends thereof respectively positioned on the pin on said hook portion of said moving block and the pin on said wall surface of said moving space.

10. The connector assembly with housing panel positioning as claimed in claim 1, wherein said plug connector further comprises a plurality of elastic claws equiangularly arranged at a free end of said connecting portion, an outer thread spirally extending around the periphery of said connecting portion, a sealing member mounted said around cable and clamped by said elastic claws, and a back cover, said back cover comprising an inner thread threaded with said outer thread so that said back cover forces said elastic claws against the periphery of said sealing member to form a water sealing structure.

11. The connector assembly with housing panel positioning as claimed in claim 1, wherein said bushing further comprises a perforation cut through the peripheral thereof and connected to said moving space; said hook portion of said moving block is inserted through said perforation of said bushing into said moving space to stick out from said bushing in direction toward said plug head.

12. The connector assembly with housing panel positioning as claimed in claim 1, wherein said plug connector further comprises a stop step extending around the periphery of said connecting portion and adjacent to said plug portion; said busing further comprises a stop convex extending around an inner wall surface of said fitting hole and stopped against said stop step.

13. A plug connector comprises a plug connection block, said plug connection block comprising a plug portion, a plug head located on a front side of said plug portion and a connecting portion located on an opposing rear side of said plug portion, a bushing sleeved onto said plug connection block and a cable axially inserted into said connecting portion and said plug portion and electrically connected to said plug head, said bushing comprising a fitting hole that receives said plug connection block, at least two lugs and a moving space provided on an inner wall surface of said fitting hole and a moving block coupled to said moving space and movable in direction of said plug head, said moving block comprising a hook portion, said hook portion being set in said fitting hole and capable of protruding from an outside thereof.

14. The plug connector as claimed in claim 13, wherein said bushing is provided with a spring, said spring having two opposite ends thereof respectively stopped against said moving block and a wall surface of said moving space for elastic positioning.

15. The plug connector as claimed in claim 14, wherein a hook portion of said moving block is provided with a pin; said wall surface of said moving space is provided with a pin; said spring has the two opposite ends thereof respectively positioned on said pin on said hook portion of said moving block and said pin on said wall surface of said moving space.

16. The plug connector as claimed in claim 14, wherein a hook portion of said moving block is provided with a round hole; said wall surface of said moving space is provided with a round hole; said spring has the two opposite ends thereof respectively positioned in said round hole on said hook portion of said moving block and said round hole on said wall surface of said moving space.

17. The plug connector as claimed in claim 13, wherein said hook portion of said moving block is provided with a pin; said wall surface of said moving space is provided with a pin; said bushing is provided with a spring, said spring having two opposite ends thereof respectively positioned on said pin on said hook portion of said moving block and said pin on said wall surface of said moving space.

18. The plug connector as claimed in claim 13, wherein said plug connector further comprises a plurality of elastic claws equiangularly arranged at a free end of said connecting portion, an outer thread spirally extending around the periphery of said connecting portion, a sealing member mounted said around cable and clamped by said elastic claws, and a back cover, said back cover comprising an inner thread threaded with said outer thread so that said back cover forces said elastic claws against the periphery of said sealing member to form a water sealing structure.

19. The plug connector as claimed in claim 13, wherein said bushing further comprises a perforation cut through the peripheral thereof and connected to said moving space; said hook portion of said moving block is inserted through said perforation of said bushing into said moving space to stick out from said bushing in direction toward said plug head.

20. The plug connector as claimed in claim 13, wherein said plug connector further comprises a stop step extending around the periphery of said connecting portion and adjacent to said plug portion; said busing further comprises a stop convex extending around an inner wall surface of said fitting hole and stopped against said stop step.

* * * * *